Figure 1:
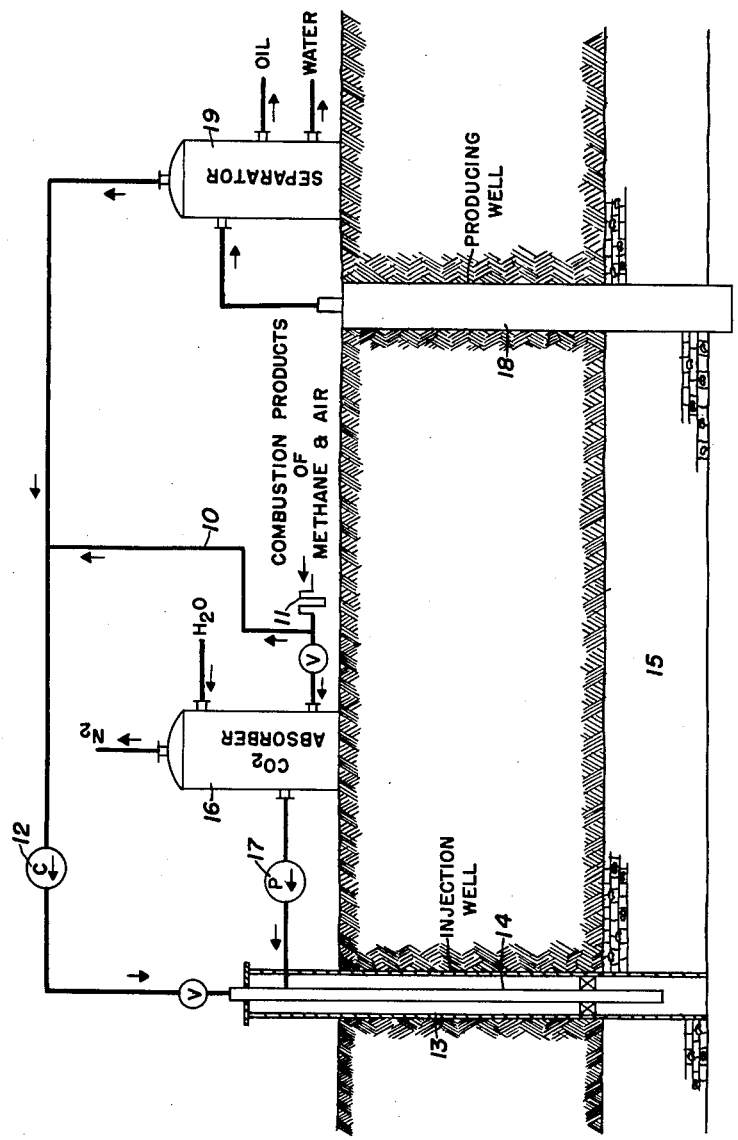

Nov. 27, 1962     LE ROY W. HOLM     3,065,790
OIL RECOVERY PROCESS
Filed Nov. 22, 1957

INVENTOR.
LEROY W. HOLM
BY
ATTORNEY

United States Patent Office 3,065,790
Patented Nov. 27, 1962

3,065,790
OIL RECOVERY PROCESS
Le Roy W. Holm, Crystal Lake, Ill., assignor to The Pure Oil Company, Chicago, Ill., a corporation of Ohio
Filed Nov. 22, 1957, Ser. No. 698,217
5 Claims. (Cl. 166—9)

This invention relates to the recovery of residual oil from partially depleted, oil-bearing geological reservoirs. It is more specifically concerned with an improved recovery process for stimulating the drainage of residual oil from limestone reservoirs normally not recoverable by conventional water-flooding or gas-injection-type, secondary recovery means.

The recovery of substantial amounts of residual oil from subterranean, vuggy limestone, geological reservoirs is effected, according to one specific embodiment of this invention, by employing a combination recovery process which comprises injecting a slug of $CO_2$ at an elevated pressure into the formation through an injection well followed by the injection of a drive fluid, preferably a saturated aqueous solution of $CO_2$, while maintaining formation pressure to effect the substantial distribution of the $CO_2$ in the reservoir fluids. After the injection of the drive fluid is completed, the system is shut in and the pressure within the formation is allowed to gradually reduce to a substantially lower pressure, during which period the producing well continues to flow. When the reservoir has declined to a level where further production is uneconomical, the production is terminated. The recovery process of this invention can be carried out at any time during the productive period of the well, either during primary recovery phase or subsequent thereto when artificial drive means are necessary to stimulate the recovery of the residual oil.

Efficiency of recovery of residual oil from subterranean geological formations depends upon a number of factors, such as reservoir rock and fluid properties, limiting water-oil or gas-oil ratios, the effectiveness of the water- or gas-drive in displacing the oil from the reservoir, as well as other aspects relating to the recovery process. In general, recovery by natural means varies from about 12% to about 80% of the oil-in-place. Typical recoveries vary from about 20 to 60%. Even though secondary recovery processes employing conventional techniques such as pressure maintenance, water-flooding, or gas-injection play an important part in the recovery of residual oil from the reservoir rocks, a large part of the oil is not physically recoverable because of the inadaptability of the field for secondary recovery work, or the uneconomical features of recovering the remaining oil even if secondary recovery techniques can be employed. To facilitate the drainage of subterranean reservoirs, several improved recovery techniques involving the use of solvents to enhance the recovery of oil from a reservoir have been developed. An investigation of these techniques has indicated that relatively small volumes of a miscible displacing phase are effective for producing substantial increases in the recovery of oil from the reservoir rock. The solvents which have been employed in these investigations include not only the hydrocarbon type of solvent, such as liquified petroleum gases including propane, butane, etc., but also the use of non-hydrocarbon-type solvents, including carbon dioxide.

Carbon dioxide has been employed in various manners for promoting the efficiency of oil recovery processes. In secondary recovery processes employing water-flooding, residual oil is flooded from partially depleted, reservoir rocks employing, as a flooding agent, water having dissolved therein carbon dioxide gas under pressure. It is asserted that the carbon dioxide contained in the carbonated flooding water enters into a chemical reaction with the hydrocarbon constituents of the formation to produce unstable compounds that are effective in releasing adherent oil from the surfaces of the reservoir rocks. Other advantages are also attributed to the process. The pressures employed in preparing the carbonated flood waters are relatively low. In other applications, carbon dioxide also finds use in recovery processes wherein carbon dioxide is injected into a reservoir at a pressure in excess of 1000 p.s.i. Whorton et al. in U.S. Patent 2,623,596 describe a typical type of carbon dioxide, high-pressure recovery process. In accordance with the Whorton et al. carbon dioxide recovery process, a gaseous mixture containing carbon dioxide, or carbon dioxide per se, is injected into the reservoir at a pressure in excess of 1000 p.s.i. and caused to be passed through the reservoir in contact with the oil contained therein to force the oil from the reservoir, without decreasing the reservoir pressure below the injection pressure employed, or below 1000 p.s.i. In forcing the carbon dioxide through the formation, an inert fluid such as water, nitrogen, air, or other fluids of low solvency for the reservoir oil, can be utilized to drive or force the carbon dioxide through the reservoir. Although substantial recoveries of oil from the reservoir rock can be effected employing the process of Whorton et al. in a sandstone type of formation, the effectiveness of this carbon dioxide recovery technique is not as great as when utilized in processing a vuggy limestone type of formation.

It is, therefore, the primary object of this invention to provide an improved combination process, using carbon dioxide for recovering oil from vuggy limestone reservoirs, wherein carbon dioxide is employed at pressures in excess of about 700 p.s.i. This and other objects will become more apparent from the following detailed description of this invention.

FIGURE 1 is a schematic diagram showing an arrangement of apparatus for conducting the process of this invention.

In accordance with this invention, the recovery of petroleum oil from subterranean, geological, vuggy limestone formations can be enhanced by employing a combination process utilizing the initial injection of a first fluid having a high solubility in oil and water at reservoir conditions, but which has higher solubility in oil than water at pressures above 700 p.s.i.; showing a relatively sharp change in solubility in oil and water with a small change in pressure over a narrow pressure range within the broader range of about 2500–500 p.s.i.; having a viscosity-reducing and swelling effect upon solution in oil; and existing in the gaseous state when released from solution. As an example, carbon dioxide is injected into a reservoir at an elevated pressure at least within the above-defined narrow range.

The pressure ranges employed are important to the efficiency of my process. It is known that the solubilities of normally gaseous fluids in liquids are dependent on perssure. It is also known that the solubility-pressure relationship often is not linear; the solubility changes more rapidly than does the pressure. In certain gas-liquid systems there is a relatively narrow pressure range within which the slope of the solubility-pressure curve becomes relatively large, i.e., solubility changes greatly when pressure is changed relatively little. For example, within the pressure range 700–900 p.s.i., the solubility of carbon dioxide in oil changes very rapidly as pressure on the system is changed by only a few pounds per square inch. In the first step of my process, I inject a first fluid, having this characteristic, into the oil-bearing reservoir at an elevated pressure at least within the range wherein the solubility changes rapidly when pressure is changed but little. A suitable second fluid, functioning as a drive medium, including plain or carbonated water, natural gas, etc., in suitable amounts is thereafter forced through the reservoir followed by the pressure depletion of the reservoir to a pressure lower than the narrow range defined above.

The amount of first fluid injected into the formation will, of course, vary for different formations and will be dependent upon total reservoir pore volume, hydrocarbon pore volume, water pore volume, or other unique formation characteristics. These determinations are made by conventional laboratory and field techniques. The approximate reservoir fluid, viz., oil and water, removal to be achieved by the injection of the first fluid, e.g., carbon dioxide, and subsequent introduction of the drive fluid is estimated, as well as the approximate amounts of reservoir fluids, viz., oil and water, that will be left in the reservoir after these steps. The estimates of these values are based on the formation characteristics determined by laboratory analysis, on previous field experience, and on laboratory flooding tests.

The amount of first fluid that will be contained in the produced oil and formation water, and the amount necessary to establish the desired concentration of the first fluid in the oil and water that will remain in the reservoir after the injection steps are then determined. The sum of these values is the amount of first fluid, e.g., carbon dioxide, to be injected, either as a slug, or as a slug plus that dissolved in drive fluid.

In other words, the fundamental criterion for defining the amount of first fluid, e.g., carbon dioxide, to be injected is that at least some of this fluid must be left dissolved in the oil and water phases remaining in the reservoir at the start of the pressure-depletion step. In general, the effectiveness of the process is directly proportional to this amount, i.e., the more carbon dioxide dissolved, the more effective the process. However, at very high amounts of carbon dioxide, incremental increases in amount cause less and less improvement in overall recovery. For example, if $CO_2$ is employed, the amount initially injected generally is within the range of about 500 to 3500 s.c.f./barrel of oil-in-place, and is followed by the introduction of the drive fluid to effect a distribution of the $CO_2$ substantially throughout the reservoir. Amounts outside this range can be used depending upon the conditions existing in the reservoir to be treated. This condition generally occurs after sufficient volumes of drive fluid have been introduced, and a low and uneconomical ratio of oil/drive fluid in the produced fluid occurs as determined by conventional recovery practices. Satisfactory distribution can occur prior to reaching this level and can be attained when a sufficient amount of the drive fluid is introduced to provide a "breakthrough" of the drive fluid into the producing well. Following specific steps of processing, and at specific pressure conditions, it has been found that between 98 and 100% oil recovery can be effected employing small amounts of carbon dioxide and carbonated water.

In its preferred embodiment, the entire process involves the treatment of a vuggy limestone formation and includes a combination of (1) expansion of the reservoir fluid by dilution with a first fluid, such as $CO_2$, (2) solvent flooding with the slug of first fluid which is partially miscible with the oil ahead of it and with the water following it, and (3) solution gas-drive produced by the $CO_2$ dissolved in the oil and that dissolved in the water present in the formation after the flood. The advantages gained include:

(1) The dilution of the oil with the first fluid, e.g., $CO_2$, facilitates increased recovery by expansion of the oil and by reduction of oil viscosity at the displacing-displaced phase front.

(2) The solvent flood involves dissolution of the solvent in the formation water.

(3) At the end of the flood, the formation contains any residual oil plus water, both highly saturated with the first fluid, e.g., $CO_2$. In the pressure depletion, the first fluid is evolved as a gas from both the oil and water to give a highly efficient gas-water-drive which displaces the remaining oil at relatively low gas/oil ratios.

After the injection of the first fluid and subsequent distribution of this fluid substantially throughout the reservoir fluids has been completed, the injection wells are shut in, flow from the producing wells is continued, and the pressure in the reservoir is permitted to gradually decrease to a level at which further production is uneconomical, at which time production is terminated. During this final step the first effluent produced consists of a solution of first fluid, e.g., carbon dioxide, dissolved in water. Then as pressure reduction continues, a solution of this fluid and oil is produced. Finally, the effluent changes to substantially pure gaseous first fluid. When this occurs, reservoir pressure may still be above atmospheric, but substantially all of the oil that is recoverable from the reservoir by the process of this invention has been produced.

The instant invention is illustrated by the following illustrative examples in which vuggy limestone cores, 3½" in diameter x 8" long. obtained from the McCook, Illinois quarry, and Berea sandstone cores having the same dimensions were employed. Each of these types of cores were treated to effect in the limestone core a 50% water–50% oil saturation, and in the sandstone cores a 45% water–55% oil saturation. Each type of core had a porosity of 15–25% and a permeability, specific to water, of 10 to 90 millidarcies. The cores were tested in a conventional core analysis apparatus using a flow system adapted to permit the sequential introduction of the various fluids employed in the investigation. In the pressure-depletion step, the pressure was decreased slowly at the rate of about 5 p.s.i. per min.

A comparison of the prior art processes and the manipulative techniques employed in the oil recovery of this invention are summarized in tabular form in Table I.

It will be noted from Table I that when a conventional water flood was employed, the total oil recovery from the sandstone core was 33%. In utilizing the $CO_2$ process described by Whorton et al. in the foregoing reference, an oil recovery of 70% is attained. This illustrates the advantages of $CO_2$ injection as compared with conventional water-flooding. By allowing the core pressure to gradually decrease to a relatively low pressure, only a small amount of additional oil is produced. In contradistinction, the use of the $CO_2$ injection process of Whorton et al. in recovering oil from a limestone reservoir, while providing an improvement over conventional water flooding, does not reach the maximum efficiency attained in the process of a sandstone type of reservoir. However, by employing the pressure-depletion step of the instant invention, additional amounts of oil are recovered, and the total amount of oil which is produced from the limestone reservoir utilizing the combination $CO_2$-injection oil recovery process of this invention substantially exceeds that produced by the Whorton process as employed in the sandstone reservoirs in accordance with his teachings. It is, therefore, evident that the instant process provides an oil recovery system which substantially completely recovers all oil from vuggy limestone reservoirs.

Another feature of this invention is illustrated by the data in Table II.

Although the instant invention is directed broadly to the use of $CO_2$, or other gaseous fluids having similar properties, followed by a fluid drive and a pressure-depletion step in the recovering of residual oil from vuggy limestones, the preferred process employs carbonated water in the flooding step instead of plain water or other injection fluids. The advantage of using carbonated water following the introduction of $CO_2$ is noted in the subsequent pressure-depletion step. Using the carbonated water, the recovery of oil remaining after the flood upon pressure depletion takes place at higher pressures, i.e.,

TABLE I

*Experimental Comparison of Whorton Process and Process of This Invention*

Sandstone core using Soltrol "C," [2] as reservoir oil

| Run | $CO_2$ injected, SCF./bbl.[1] | Injection conditions | | Oil recovery—Percent oil-in-place | | | Remarks |
|---|---|---|---|---|---|---|---|
| | | Temp., °F. | Injection press., p.s.i.g. | By flood | By pressure depletion | Total | |
| A | 1,600 | 130 | 1,300 | 80 | ---- | 80 | (1) Point at which Whorton, et al. process stops. |
| 1 | 1,600 | 130 | 1,300 | (1) 83 | 3.0 | 86 | (2) Conventional water flood for comparison. |
| 3 | None | 130 | 1,300 | (2) 33 | None | 33 | |

Limestone core using Soltrol "C," as reservoir oil

| 4 | 1,350 | 130 | 1,300 | (1) 58 | 28 | 86 | (1) Point at which Whorton, et al. process stops. |
| 5 | 300 | 130 | 1,300 | (1) 37 | 37 | 74 | |
| 6 | 2,000 | 130 | 1,300 | 56 | 31 | 87 | |
| 7 | None | 130 | 1,300 | 32 | None | 32 | |

Limestone core using recombined crude oil as reservoir oil having a viscosity, at reservoir conditions, of 2.7 centipoises Van Zandt comprising asphaltic crude oil plus methane gas minus saturation pressure of 1,500 p.s.i. at 130° F.

| C | 1,500 | 130 | 1,700 | 50 | ---- | 50 | (1) Point at which Whorton, et al. process stops. |
| 8 | 1,500 | 130 | 1,700 | (1) 50 | 38 | 88 | (2) Conventional water flood for comparison. |
| 9 | None | 130 | 1,700 | (2) 40 | None | 40 | |

Limestone core using crude oil (stock tank oil) as reservoir oil, highly asphaltic Van Zandt crude having no dissolved gas

| 11 | 1,300 | 130 | 1,300 | (1) 34 | 45 | 79 | (1) Point at which Whorton process stops. |
| 12 | 2,100 | 130 | 1,300 | (1) 44 | 31 | 75 | |

[1] Total $CO_2$, in standard cubic feet per barrel of oil originally in place, viz., $CO_2$ initially injected plus $CO_2$ dissolved in water flood.

[2] A proprietary hydrocarbon oil having a viscosity of 1.3 centipoises and marketed by Phillips Petroleum Co.

TABLE II

| Injection fluids | | | Injection conditions | | Pressure depletion, oil recovery—percent oil-in-place | | | | |
|---|---|---|---|---|---|---|---|---|---|
| $CO_2$ SCF./bbl. | | Carbonated water, percent pore volume | Press p.s.i. | Temp., °F. | By flood | 1,300 to 300 p.s.i. | 300 p.s.i. to atm. press. | 1,300 p.s.i. to atm. press. | Total |
| A | B | | | | | | | | |
| 1,400 | 450 | 50 | 1,300 | 130 | 63 | ---- | ---- | 33.5 | 96.5 |
| 1,000 | None | [1] 45 | 1,300 | 130 | 50 | 2 | 34 | ---- | 86 |
| 1,000 | 250 | [2] 30 | 1,300 | 130 | 53 | 25 | 5 | ---- | 84 |

[1] Distilled water.  [2] Carbonated water (saturated at 1,300 p.s.i. and 60° F.).

Note.—SCF./bbl.=Standard cubic feet of $CO_2$ per barrel of oil in place. $CO_2$ injection shown includes (A) $CO_2$ injected as a "slug" and (B) $CO_2$ used to carbonate the water.

from flood pressure to 300 p.s.i. (principally between 1500 and 700 p.s.i.). Using plain water or brine, the oil recovery during pressure depletion takes place at pressures below about 300 p.s.i. In this instance, only a small amount of oil is recovered during the period in the pressure-depletion step when the pressure is between flood pressure and 300 p.s.i.

The practical aspect of this preferred expedient is very important as it would be difficult in all instances to reduce pressure in most reservoirs to pressures below 300 p.s.i. Accordingly, oil recovery employing the process of the invention by the pressure-depletion step when using $CO_2$ followed by plain water would be employed in special situations. On the other hand, using carbonated water in the flooding step, the oil recovery at higher pressures has wider, more practical application.

Improved efficiency in the oil recovery by this invention is also produced by the use of another manipulative step. This step involves the continuation of the water flood after pressure depletion has proceeded to about 500 p.s.i., and maintaining the pressure at 500 p.s.i. until water breakthrough.

By water-flooding at this point to remove the residual oil, a more efficient oil recovery is effected over that obtained by continuation of the pressure depletion, which results in continuation of the $CO_2$ gas-drive to recover the oil. The total recovery of oil by using the above water-flood step is not increased over that obtained by pressure depletion to atmospheric pressure. The advantage is that the oil is recovered more efficiently because oil recovery by pressure depletion in the low-pressure range (below about 300 or 400 p.s.i.) is a very slow and rather inefficient process.

In employing the process of this invention in the exploitation of a petroleum reservoir, conventional production equipment is utilized. Because the system requires the injection of fluids into a subterranean geological petroleum reservoir, it is necessary that a combination of injection and producing wells be employed. The injected fluids, including the $CO_2$ and carbonated flood waters, are introduced into the injection well in a conventional manner taking into consideration the elevated pressure at which these fluids are introduced. Equipment for the introduction of the gaseous fluid initially introduced at superatmospheric pressure will depend upon the injection pressures required. Generally, compressor plants designed for two- or three-stage compressions are employed. Equipment which is used in the pneumatic lifting of oil from well bores can be readily adapted to the pressure-injection process of this invention. Secondary recovery apparatus can be utilized for the injection of the various fluids used in the process. Because the particular gas-compression practice and techniques employed for injection of gaseous and/or liquid fluids into a geological reservoir are within the skill of one working in the art, and outside the scope of this invention, the mechanical equipment necessary for the introduction of the injection fluids of this invention is left to the choice of such workers. For detailed descriptions of mechanical equipment, reference is made to Uren: "Petroleum Production Engineering—Oilfield Exploitation" McGraw-Hill, 1953, as well as standard reference works on the subject of gas compression.

In FIGURE 1 is shown schematically a typical installation. Initially, $CO_2$ is obtained by the combustion of methane in a suitable apparatus (not shown). The products of combustion, viz., $CO_2$, $H_2O$, and $N_2$, are introduced into the system through line 10 and cooled in heat exchanger 11. Compressor 12 is employed to increase the pressure of the $CO_2$ mixture to injection pressure. The gas at elevated pressure is injected into injection well 13 through tubing 14 into the vuggy limestone formation 15. After sufficient $CO_2$ is injected, the piping manifold system is switched and the $CO_2$ mixture introduced into absorber 16. Water is introduced into the absorber and counter-currently contacted with the $CO_2$ mixture until the $CO_2$ is absorbed. The $N_2$ is freed and rises to the top of the absorber where it is drawn off. The carbonated water is then pumped into the formation by means of pump 17. The produced fluids are recovered in producing well 18, and introduced into separator 19 where the oil and water are separated and the $CO_2$ recovered. The latter products are then recycled for re-use in the process.

The $CO_2$ which is initially injected into the formation at elevated pressures is obtained from conventional sources, including $CO_2$-producing wells, burning of natural gas or crude oil in oxygen or in air, etc. With air, a purifying step may be required to remove $N_2$. Internal combustion engine exhaust gas is another source of $CO_2$. It, too, would have to be purified.

Although it is preferred that $CO_2$ be used alone and not mixed with other gaseous constituents, in the event that mixtures containing $CO_2$ can conveniently be obtained, they can be used if they contain amounts of $CO_2$ in excess of about 80%.

Non-condensable constituents, such as $N_2$, do not have a deleterious effect in the process if they are present in small amounts (less than 5%). They can be tolerated in amounts up to about 20%, if the economics of purifying a $CO_2$ mixture beyond such a point are unfavorable, but efficiency is adversely affected.

The $CO_2$ is injected into the formation at an injection pressure from about 700 to 3500 p.s.i., preferably within the range of 1200 to 1800 p.s.i. The amount of $CO_2$ which is injected will depend upon formation conditions, the composition of the $CO_2$ mixture, and the composition of the reservoir fluid. In general, amounts of $CO_2$ within the range of about 500 to 3500 s.c.f./barrel of oil-in-place can be used in carrying out the invention.

Because the mass $CO_2$ injection rate has an influence on the efficiency of the recovery process, it is preferred that $CO_2$ be injected into the reservoir at the highest rate possible. In general, injection rates of about 300–3000 s.c.f.h., especially 800–1600 s.c.f.h., are effective. The quantity of $CO_2$ has an effect on the efficiency of the recovery process, as does the mass rate of injection. Mass rate of injection, however, affects the flood recovery in particular. Higher mass injection rates at the start of a flood tend to increase flood recoveries because a bank of $CO_2$ is built up to give an improved piston-like action during the flood. As the reservoir is, in most cases, at a temperature above the critical temperature of $CO_2$, the $CO_2$ will be a gas as it enters the reservoir and will tend to channel ahead in the reservoir. However, as it combines with oil it will form a liquid solution of oil and $CO_2$ (rich in $CO_2$). It is important to form a bank of this solution to obtain a "slug-type" solvent flood which can move through the reservoir uniformly. On the other hand, a lower injection rate after the bank is formed is desirable so that distribution of $CO_2$ through the oil can take place. This distribution assists in the removal of that oil which can be removed by flooding, and also in removal of oil by subsequent pressure depletion.

In the illustrative examples, $CO_2$ is initially introduced into the formation. It is to be understood, however, that the instant invention can be carried out employing other normally gaseous fluids in the initial injection step. Suitable fluids are those which have high solubilities in oil and water at reservoir conditions, but which have higher solubilities in oil than in water at pressures above about 700 p.s.i.; show a relatively sharp change in solubility in oil and water with a small change in pressure over a narrow pressure range within the broader range of 2500 to 500 p.s.i.; have a viscosity-reducing and swelling effect upon solution in oil; and exist in gaseous state when released from solution by pressure depletion. Examples of suitable fluids include, but are not limited to, $H_2S$, $C_2H_6$, $N_2O$ and others.

The drive fluid employed in the intermediate drive step can, in general, be any fluid which is partially miscible in the gas initially introduced into the formation, but is substantially immiscible in the oil phase of the reservoir fluid. Plain water or brine, as discussed above, could be employed as a replacement for the carbonated water if a sacrifice in the efficiency of displacement could be tolerated to obtain other advantages. The water-drive fluid could also be replaced by gaseous drive fluids, such as nitrogen, air, etc. The substitution, however, of these immiscible fluids would also result in a lower recovery efficiency.

If carbonated water is to be employed as the flood water, it is prepared by injecting about 200 to 300 volume percent of $CO_2$ into the flood water which is used. The amount of $CO_2$ which is included in the carbonated flood water depends upon the conditions of temperature and pressure which are utilized to effect the dissolution of the carbon dioxide in water. It is preferred that a saturated solution of carbonated flood-water be employed; however, other degrees of carbonation can be used with a resulting decrease in efficiency. Solution of the carbon dioxide in water can be accomplished either above the ground or in the well bore while the water is being forced into the reservoir.

Generally, depending upon the conditions which are employed for the absorption of $CO_2$ or other suitable fluid previously injected into the formation, sufficient amounts of carbonated water, or other equivalent, drive fluid in which the $CO_2$ or other injected fluid is partially immiscible, but which is substantially immiscible in the reservoir fluid, are injected into the formation until water breakthrough, or breakthrough of the drive fluid, occurs at the producing well. The drive fluid employed in this phase of the invention will be introduced in sufficient amounts and at such a rate to result in a linear advance of the flood front through the reservoir within the range of about 0.1–5 feet per day, preferably 1 foot.

After the injection of the water-drive fluid or other inert fluid has been completed, the injection wells are shut in. Production of fluids from the producing well, however, is continued. With this continuing production, the pressure in the formation continues to gradually decrease until eventually the formation pressure decreases to a pressure substantially less than injection pressure at the well head. At this time production is terminated.

It is to be noted that this pressure-depletion step, while having no appreciable effect on the recovery of oil from a sandstone formation, has a substantial effect on the recovery from limestone reservoirs. Reservoir conditions will determine the rate at which the pressure in the formation will decrease. Normally, a high rate is desirable when employing $CO_2$, particularly during the reduction of the reservoir pressure to about 700 p.s.i. The solubility of $CO_2$ changes very sharply in the range of 700 to 1000 p.s.i. Throughout this pressure range, it is advantageous to reduce the pressure rapidly. It is preferred that the pressure-depletion rate be maintained as high as possible and still continue the production of the reservoir fluid. Generally, pressure depletion will be carried out at the rate of 150 to 200 p.s.i. decrease in pressure per year, but this rate will vary widely because of differences in the characteristics of reservoirs.

As is apparent from the foregoing description of this invention, the combination process described herein is especially adaptable in the production of oil from limestone reservoir rocks, or reservoir rocks which are predominantly limestone, including dolomitic and other limestone-type of rocks.

The type of formation to which this invention is directed is an oil-bearing rock reservoir which has an irregular pore geometry or porosity such that trapping, one-way situations exist. The irregular porosity is vugular, having dead-end cavities, traps, voids, and fractures, and is principally associated with carbonate rocks which have undergone subareal solution, recrystallization, and leaching. Such limestone rocks are made up of shell fragments, coolites, organic debris of sand size or calcarenites, calcareous muds or calcilutiles, and so forth. The grains originally formed are readily soluble materials, e.g., calcite, dolomite, or aragonite, which are affected by solution and recementing to form irregular porosity.

This type of pore geometry or porosity is to be distinguished from the regular, intergranular porosity commonly associated with quartzose sandstone where traps or vugs are not usually found.

The important point concerning the application of this invention is the type of porosity, i.e., irregular as explained above. In general, the invention is applicable to oil-bearing rock formations which contain dead-end cavities or traps which cannot be flooded or swept out from one end to another. The limestone formations, are in general, examples of this kind of formation. To facilitate a description of this invention, formations of this nature will be referred to in the appended claims as "vuggy limestone reservoirs."

Although the subject combination process for the recovery of oil from limestone reservoirs is specifically illustrated by a number of examples, it is obvious that a number of modifications will be apparent to those skilled in this particular art and can be made without departing from the scope of the instant invention. Accordingly, it is intended that these illustrative examples will only serve to point out the essence of the invention to those skilled in the art and that the instant invention is limited only in the manner defined by the instant claims.

What is claimed as my invention is:

1. A process for producing a petroleum oil from an oil-bearing, vuggy limestone rock reservoir traversed by an injection well and a producing well which comprises injecting into said reservoir through said injection well 500 to 3500 s.c.f. of $CO_2$ per barrel of said oil in place, to provide an elevated pressure not less than about 700 p.s.i. in said reservoir, through said injection well; maintaining the reservoir at the elevated pressure; injecting an aqueous drive fluid into said reservoir through said injection well at said elevated pressure until breakthrough of said drive fluid occurs at said producing well; and then shutting in said injection well and producing petroleum oil from said producing well at a rate sufficient to reduce the pressure in said reservoir to a pressure substantially lower than said elevated pressure.

2. A process for producing a petroleum oil from an oil-bearing, vuggy limestone rock reservoir traversed by an injection well and a producing well which comprises injecting into said reservoir through said injection well 500 to 3500 s.c.f. of $CO_2$ per barrel of said oil in place to provide an elevated pressure in said formation of not less than about 700 p.s.i.a.; maintaining the reservoir at the elevated pressure; injecting an aqueous solution of $CO_2$ into said reservoir, through said injection well, until breakthrough of said aqueous solution occurs at said producing well, the amount of said carbon dioxide injected being at least sufficient to provide a concentration of carbon dioxide in the reservoir fluids remaining in the reservoir subsequent to the injection of said aqueous solution; and then shutting in said injection well and producing petroleum oil from said producing well at a rate sufficient to reduce the pressure in said reservoir to a pressure substantially lower than said elevated pressure.

3. A process in accordance with claim 2 in which said aqueous solution is substantially saturated with $CO_2$.

4. A process for producing petroleum oils from an oil-bearing, vuggy limestone rock reservoir traversed by an injection well and a producing well which comprises injecting $CO_2$ into said reservoir through said injection well to provide an elevated pressure in said formation of not less than about 700 p.s.i.; maintaining the reservoir at the elevated pressure; injecting an aqueous drive fluid into said reservoir through said injection well, at said elevated pressure, until breakthrough of said drive fluid occurs at said producing well, the amount of said carbon dioxide injected being at least 500 s.c.f. per barrel of oil in place and sufficient to provide a concentration of carbon dioxide in the reservoir fluids remaining in the reservoir subsequent to the injection of said drive fluid; producing petroleum oil from said producing well at a rate sufficient to reduce the pressure in said reservoir to about 500 p.s.i.; and introducing an aqueous drive fluid into said reservoir while maintaining said reservoir at a pressure of about 500 p.s.i.

5. A process in accordance with claim 4 in which said aqueous solution is substantially saturated with $CO_2$.

References Cited in the file of this patent

UNITED STATES PATENTS

| | | |
|---|---|---|
| 2,412,765 | Buddrus et al. | Dec. 17, 1946 |
| 2,623,596 | Whorton et al. | Dec. 30, 1952 |
| 2,669,307 | Mulholland et al. | Feb. 16, 1954 |
| 2,875,831 | Martin et al. | Mar. 3, 1959 |
| 2,878,874 | Allen | Mar. 24, 1959 |

OTHER REFERENCES

Uren: Petroleum Production Engineering, Exploitation, 2nd eddition, published by McGraw-Hill Book Co. of New York, 1939, pages 423 to 426.